US011328389B2

(12) United States Patent
Petruk

(10) Patent No.: US 11,328,389 B2
(45) Date of Patent: May 10, 2022

(54) SYSTEMS AND METHODS FOR IMAGE STITCHING

(71) Applicant: OOO ISS-SOFT, Moscow (RU)

(72) Inventor: Vladimir Petruk, Moscow (RU)

(*) Notice: Subject to any disclaimer, the term of this patent is extended or adjusted under 35 U.S.C. 154(b) by 0 days.

(21) Appl. No.: 16/956,578

(22) PCT Filed: Dec. 21, 2018

(86) PCT No.: PCT/US2018/067079
§ 371 (c)(1),
(2) Date: Jun. 20, 2020

(87) PCT Pub. No.: WO2019/133477
PCT Pub. Date: Jul. 4, 2019

(65) Prior Publication Data
US 2021/0027424 A1    Jan. 28, 2021

Related U.S. Application Data

(60) Provisional application No. 62/611,913, filed on Dec. 29, 2017.

(51) Int. Cl.
G06T 3/40      (2006.01)
G06T 7/80      (2017.01)
G06T 7/73      (2017.01)
G06T 7/00      (2017.01)

(52) U.S. Cl.
CPC .......... *G06T 3/4038* (2013.01); *G06T 7/0002* (2013.01); *G06T 7/73* (2017.01); *G06T 7/80* (2017.01); *G06T 7/97* (2017.01)

(58) Field of Classification Search
CPC .......... G06T 3/4038; G06T 7/80; G06T 7/73; G06T 7/97; G06T 7/0002
See application file for complete search history.

(56) References Cited

U.S. PATENT DOCUMENTS

| 7,231,065 | B2 | 6/2007 | Peach et al. |
| 8,184,852 | B2 | 5/2012 | Hofman et al. |
| 8,306,649 | B2 | 11/2012 | Buzzoni et al. |

(Continued)

FOREIGN PATENT DOCUMENTS

| KR | 20100058278 A | 6/2010 |
| WO | WO2009052854 A1 | 4/2009 |
| WO | WO2016/161047 | 10/2016 |

OTHER PUBLICATIONS

Dickson et al., Mosaic Generation for Under Vehicle Inspection, Sixth IEEE Workshop on Applications of Computer Vision, 2002, (6 pages).

(Continued)

*Primary Examiner* — Chan S Park
*Assistant Examiner* — Daniel C Chang
(74) *Attorney, Agent, or Firm* — Dentons US LLP

(57) ABSTRACT

The computing technologies include a processor in communication with a sensing device and with an imaging device. The sensing device and the imaging device input a set of sensing data and a set of imaging data respectively into the processor such that the processor is able to determine whether a vehicle is present within an operational area. If so, then the processor is able to stitch a set of frames from the set of imaging data for subsequent recordation into a storage device.

21 Claims, 7 Drawing Sheets

(56) References Cited

U.S. PATENT DOCUMENTS

| | | | |
|---|---|---|---|
| 8,720,777 | B2 | 5/2014 | King et al. |
| 2008/0136625 | A1 | 6/2008 | Chew |
| 2008/0211914 | A1 | 9/2008 | Herrera et al. |
| 2014/0022392 | A1 | 1/2014 | Pederson |
| 2015/0296105 | A1 | 10/2015 | De Geeter et al. |
| 2015/0341629 | A1 | 11/2015 | Zeng et al. |
| 2016/0253576 | A1 | 9/2016 | Kilpatrick |
| 2017/0126972 | A1* | 5/2017 | Evans, V .............. H04N 5/247 |
| 2017/0332052 | A1 | 11/2017 | Lu et al. |
| 2018/0276792 | A1* | 9/2018 | Stepanenko .......... G06T 1/0007 |
| 2019/0235126 | A1* | 8/2019 | Petruk .................... G06T 7/162 |

OTHER PUBLICATIONS

International Search Report and Written Opinion dated Mar. 14, 2019 in related application No. PCT/US18/67079 filed Dec. 21, 2018 (8 pages).

Lase, LaseCDI-GATE, Container Damage Inspection, Product Data Sheet, downloaded from Internet Dec. 15, 2016, https://www.porttechnoloqy.org/directory/lase_industrielle_lasertechnik_gmbh/products/22192 (3 pages).

ORBITA Ports & Terminals, The Terminal Automation Company Brochure, downloaded from internet Dec. 16, 2016, http://www.orbitaports.com/ProductsandSolutions/Complete_catalogue (86 pages).

Yoon et al., Automatic Container Code Recognition from Multiple Views, ETRI Journal, vol. 38, Issue 4, Aug. 2016, pp. 767-775.

\* cited by examiner

SYSTEMS AND METHODS FOR IMAGE STITCHING

This patent application claims a benefit of priority to International Patent Application PCT/US2018/067079 filed 21 Dec. 2018; which claims a benefit of U.S. Provisional Application 62/611,913 filed 29 Dec. 2017, each of which is incorporated by reference herein for all purposes.

TECHNICAL FIELD

Generally, this disclosure relates to image processing. More particularly, this disclosure relates to image stitching.

BACKGROUND

An intermodal container can be transported via a vehicle, such as a truck, a trailer, a railcar, a boat, an airplane, a crane, a conveyor assembly, or others. During such transportation, the intermodal container can be structurally damaged, such via a dent, a puncture, an explosion, a leak, or others. As such, there is a desire to document when and where this damage occurred, while also identifying the vehicle that transported the intermodal container before, during, or after such damage.

One approach to provide such documentation is to transport the intermodal container underneath a line-scan camera fixed to a checkpoint. However, such approach is technically problematic for several reasons. First, the vehicle may change speeds during such transport, whether via acceleration or deceleration, which can lead to image distortion along a travel path of the vehicle, such as image compression, image stretching, or others. Second, the vehicle may travel along a non-rectilinear path, which can lead to image curving, perspective distortion, or others. Third, the vehicle may temporarily stop underneath the line-scan camera, which renders the line-scan camera effectively unusable for that time period. Fourth, when no vehicle or when no intermodal container is present underneath the line-scan camera, then the line-scan camera is idle, which is inefficient.

If more than one intermodal container is involved, then these technical problems become complicated to manage logistically in an accurate manner. Likewise, if more than one vehicle is involved, then these technical problems become complicated to manage logistically in an accurate manner.

SUMMARY

Broadly, this disclosure discloses various computing technologies that address various technical problems identified above. These computing technologies include a processor in communication with a sensing device and with an imaging device. The sensing device and the imaging device input a set of sensing data and a set of imaging data respectively into the processor such that the processor is able to determine whether a vehicle is present within an operational area. If so, then the processor is able to stitch a set of frames from the set of imaging data for subsequent recordation into a storage device.

In an embodiment, there is provided a method comprising: determining, by a server, whether a set of data is informative of a presence of a vehicle relative to a checkpoint or an absence of the vehicle relative to the checkpoint, wherein the set of data includes a set of video frames received from a wide-angle lens camera hosted via the checkpoint and a set of signals received from a sensor hosted via the checkpoint, wherein the server is remote from the checkpoint; based on the server determining that the set of data is informative of the presence of the vehicle relative to the checkpoint: dewarping, by the server, the set of video frames; forming, by the server, a set of dewarped images from the set of video frames; stitching, by the server, the set of dewarped images such that an image is formed; relating, by the server, the image with an identifier of the vehicle; granting, by the server, a read access for the image and the identifier to a client remote from the wide-angle lens camera and the sensor; based on the server determining that the set of data is informative of the absence of the vehicle relative to the checkpoint: performing, by the server, at least one of: completing a formation of the set of dewarped images based on the formation already taking place at that time; or ignoring the set of video frames based on the formation not taking place at that time.

In an embodiment, there is provided a system comprising: a checkpoint hosting a wide-angle lens camera and a sensor configured to sense a vehicle; a client remote from the wide-angle lens camera and the sensor; and a server remote from the checkpoint, wherein the server is programmed to: determine whether a set of data is informative of a presence of the vehicle relative to the checkpoint or an absence of the vehicle relative to the checkpoint, wherein the set of data includes a set of video frames received from the wide-angle lens camera and a set of signals received from the sensor; based on the server determining that the set of data is informative of the presence of the vehicle relative to the checkpoint: dewarp the set of video frames; form a set of dewarped images from the set of video frames; stitch the set of dewarped images such that an image is formed; relate the image with an identifier of the vehicle; grant a read access for the image and the identifier to the client; based on the server determining that the set of data is informative of the absence of the vehicle relative to the checkpoint: perform at least one of: complete a formation of the set of dewarped images based on the formation already taking place at that time; or ignore the set of video frames based on the formation not taking place at that time.

DETAILED DESCRIPTION

Figure 1:
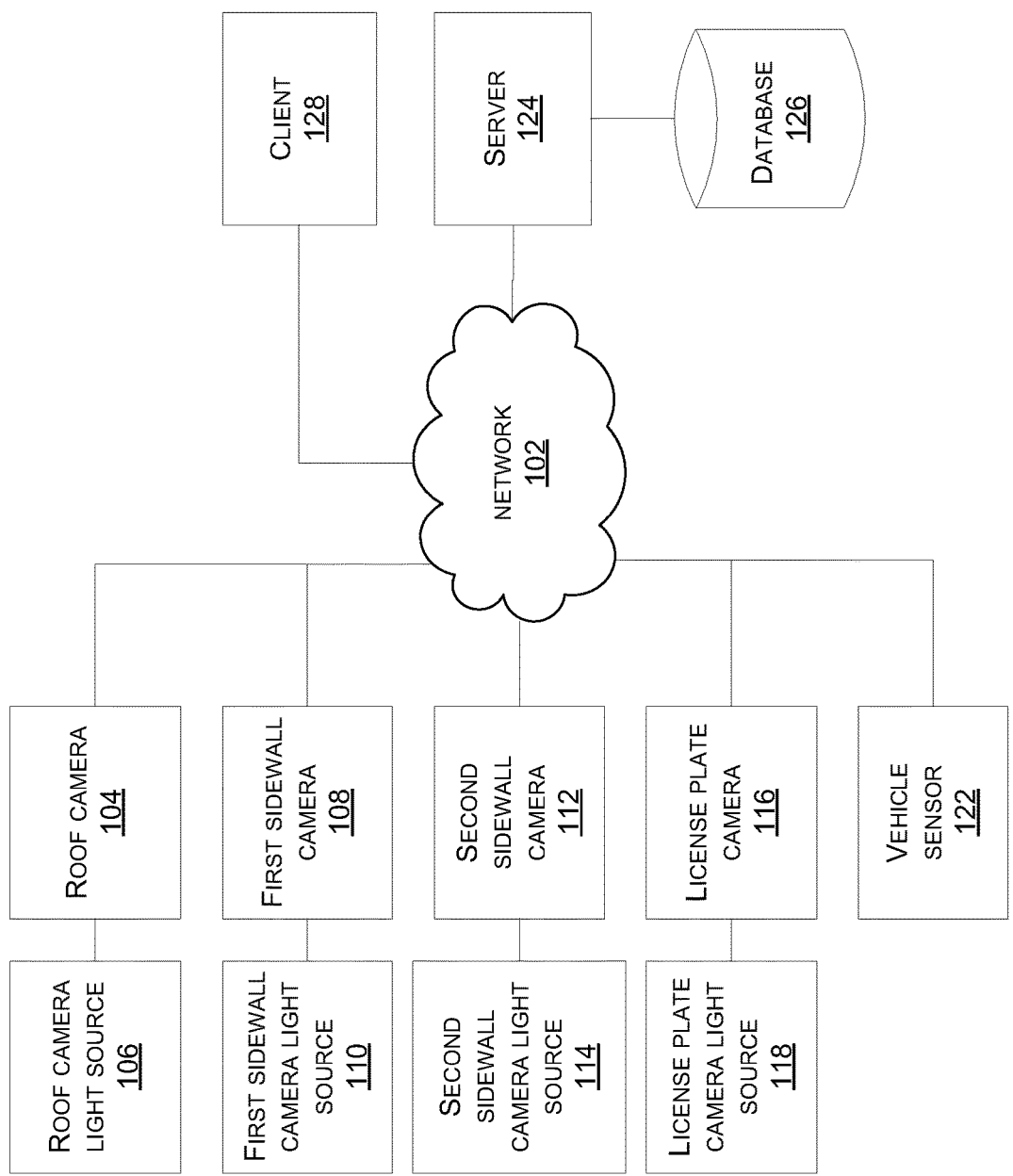
FIG. 1 shows a schematic diagram of an embodiment of a network topology according to this disclosure.

Generally, this disclosure enables a technology to document when and where a damage to an intermodal container has occurred, while also identifying a vehicle, such as a truck, a trailer, a railcar, a boat, an airplane, a crane, a conveyor assembly, or others, that transported the intermodal container before, during, or after the damage.

In particular, the intermodal container has a plurality of sides, such as a roof, a base, and a plurality of sidewalls spanning between the roof and the base, thereby defining an interior space for storage. The vehicle hosts a vehicle identifier, such as a vehicle registration plate or others, such as a license plate or others. As such, the technology enables a server to receive a plurality of container frames, such as a plurality of images, depicting the sides from a first camera, which can include a single camera or a plurality of cameras with a plurality of optical axis facing the sides in any permutational or combinatory manner, having a wide-angle lens, as the intermodal container is transported via the vehicle through a checkpoint equipped with the first camera.

The server is enabled to receive a vehicle identifier frame, such as an image, from a second camera, as the vehicle is in a physical proximity of the checkpoint, such as when the vehicle is about to enter the checkpoint, when the vehicle is within the checkpoint, or when the vehicle is leaving the checkpoint. The server is in network communication with a client, such as a workstation, a terminal, a laptop, a tablet, or others. The client is remote from the checkpoint and is operated by a user. Consequently, the user can manually review the frames and thereby determine whether the intermodal container is structurally damaged, such via a dent, a puncture, an explosion, a leak, or others, as the vehicle is in the physical proximity of the checkpoint, such as when the vehicle is about to enter the checkpoint, when the vehicle is within the checkpoint, or when the vehicle is leaving the checkpoint.

The server saves the container frames and the vehicle identifier frames into a database such that the container frames and the vehicle identifier frames are logically associated with each other, such as via a key or others. Note that although this technology is described in a context of the intermodal container, this technology can be applied to other contexts. For example, this technology can be used with any type of cargo other than the intermodal container, such as actual machinery/equipment, raw materials, parcel packages, physical letters, food containers, medical devices, or other good or forms of structural inspection for logistical systems, distribution systems, supply chain systems, quality control systems, assembly lines, tamper detection systems, or others. Moreover, note that although the container frames are captured optically, this technology can be applied to non-optical capture as well, such as via an ultrasound machine, an X-ray machine, an magnetic resonance imaging (MRI) machine, a radar, a lidar, a laser, a heat sensor, or any other form of image formation through any input means or modality.

This disclosure is now described more fully with reference to FIGS. 1-7, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

FIG. 1 shows a schematic diagram of an embodiment of a network topology according to this disclosure. In particular, a network topology 100 comprises a network 102, a roof camera 104, a roof camera light source 106, a first sidewall camera 108, a first sidewall camera light source 110, a second sidewall camera 112, a second sidewall camera light source 114, a license plate camera 116, a license plate camera light source 118, a vehicle sensor 122, a server 124, a database 126, and a client 128.

Each of the roof camera 104, the first sidewall camera 108, the second sidewall camera 112, the license plate camera 116, and the vehicle sensor 122 are in communication with the network 102. The roof camera 104 is in communication with the roof camera light source 106. The first sidewall camera 108 is in communication with the first sidewall camera light source 110. The second sidewall camera 112 is in communication with the second sidewall camera light source 114. The license plate camera 116 is in communication with the license plate camera light source 118.

The server 124 is in communication with the network 102. The server 124 is in communication with the database 126. The client 128 is in communication with the network 102. In some embodiments, at least one of the roof camera light source 106, the first sidewall camera light source 110, the second sidewall camera light source 114, or the license plate camera light source 118 is in communication with the network 102. In some embodiments, the database 126 can be unitary with the server 124. In some embodiments, the roof camera 104 and the roof camera light source 106 are unitary. In some embodiments, the first sidewall camera 108 and the first sidewall camera light source 110 are unitary. In some embodiments, the second sidewall camera 112 and the second sidewall camera light source 114 are unitary. In some embodiments, the license plate camera 116 and the license plate camera light source 118 are unitary.

The network 102 includes a plurality of nodes that allow for sharing of resources or information. The network 102 can be wired or wireless. For example, the network 102 can be a local area network (LAN), a wide area network (WAN), a cellular network, or others.

Each of the roof camera 104, the first sidewall camera 108, the second sidewall camera 112, and the license plate camera 116 includes an optical instrument for capturing and recording images, which may be stored locally, transmitted to another location, or both. The images may be individual still photographs or sequences of images constituting videos. The images can be analog or digital, whether color or grayscale. Each of the roof camera 104, the first sidewall camera 108, the second sidewall camera 112, and the license plate camera 116 can comprise any type of lens, such as convex, concave, fisheye, or others. Each of the roof camera 104, the first sidewall camera 108, the second sidewall camera 112, and the license plate camera 116 can comprise any focal length, such as wide angle or standard. Each of the roof camera 104, the first sidewall camera 108, the second sidewall camera 112, and the license plate camera 116 can be stationary or movable.

Each of the roof camera 104, the first sidewall camera 108, the second sidewall camera 112, and the license plate camera 116 is powered via mains electricity, such as via a power cable or a data cable. In some embodiments, at least one of the roof camera 104, the first sidewall camera 108, the second sidewall camera 112, or the license plate camera 116 is powered via at least one of an onboard rechargeable battery, such as a lithium-ion battery, which may be charged via an onboard renewable energy source, such as a photovoltaic cell, a wind turbine, or a hydropower turbine. At least one of the roof camera 104, the first sidewall camera 108, the second sidewall camera 112, or the license plate camera 116 can be configured for geo-tagging, such as via modifying an image file with geolocation/coordinates data. At least one of the roof camera 104, the first sidewall camera 108, the second sidewall camera 112, or the license plate camera 116 can include or be coupled to a microphone. At least one of the roof camera 104, the first sidewall camera 108, the second sidewall camera 112, or the license plate camera 116 can be a PTZ camera, which may be a virtual PTZ camera. At least one of the roof camera 104, the first sidewall camera 108, the second sidewall camera 112, or the license plate camera 116 can be configured for a name-stamping, date-stamping, or time-stamping the image, such as what date or time the image was captured or naming the image with a naming convention, as pre-programmed in advance.

Each of the roof camera light source 106, the first sidewall camera light source 110, the second sidewall camera light source 114, or the license plate camera light source 118 comprises a flash illumination output device or another artificial illumination output device. In some embodiments, at least one of the roof camera light source 106, the first sidewall camera light source 110, the second sidewall camera light source 114, or the license plate camera light source 118 can comprise an infrared illumination output device.

The vehicle sensor 122 is configured to sense at least one of a presence or an absence of a vehicle in operational proximity thereof, such as within operational proximity of at least one of the roof camera 104, the first sidewall camera 108, the second sidewall camera 112, or the license plate camera 116. For example, the vehicle sensor 122 can be an optical sensor, an ultrasonic sensor, an ultrasound sensor, a laser sensor, a radar, a lidar, a heat sensor, an actuator, a mechanical linkage, a load cell, a ferromagnetic sensor, a motion sensor, a proximity sensor, a distance sensor, or others. In some embodiments, the vehicle sensor 122 can be an all-weather sensor.

The server 124 runs an operating system, such as MacOS®, Windows®, or others, and an application, such as a video analytics application, on the operating system. The server 124 can include or be coupled to an input device, such as a mouse, a keyboard, a camera, whether forward-facing or back-facing, an accelerometer, a touchscreen, a biometric reader, a clicker, a microphone, or any other suitable input device. The server 124 can include or be coupled to, an output device, such as a display, a speaker, a headphone, a printer, or any other suitable output device. In some embodiments, the input device and the output device can be embodied in one unit, such as a touch-enabled display, which can be haptic.

The database 126 includes a storage medium having a data structure suitable for storing a set of data. For example, the database 126 can be a relational database, an in-memory database, a NoSQL database, a graphical database, or others, which can store data, such as in a record field, and allow access to such data, whether in a raw state, a formatted state, an organized stated, or any other accessible state. For example, such data can include an image file, a sound file, an alphanumeric text string, or any other data. The database 126 is configured for various data Input/Output (I/O) operations, including reading, writing, editing, modifying, deleting, updating, searching, selecting, merging, sorting, encrypting/decrypting, de-duplicating, or others.

The client 128 runs an operating system, such as MacOS®, Windows®, or others, and an application, such as an administrator application, on the operating system. For example, the client 128 can be embodied as a workstation, a terminal, a laptop, a tablet, a smartphone, a vehicle, whether manned or unmanned, whether land, aerial, or marine, or others. The client 128 can include or be coupled to an input device, such as a mouse, a keyboard, a camera, whether forward-facing or back-facing, an accelerometer, a touchscreen, a biometric reader, a clicker, a microphone, or any other suitable input device. The client 128 can include or be coupled to an output device, such as a display, a speaker, a headphone, a printer, or any other suitable output device. In some embodiments, the input device and the output device can be embodied in one unit, such as a touch-enabled display, which can be haptic. As such, the application presents an administrator graphical user interface (GUI) configured to depict a page, where the page can include a visual element, such as a menu, enabling a control of an aspect of the topology 100, such as any hardware, software, or any other logic or functionality. For example, the client 128 can be configured to control at least one of the network 102, the server 124, the database 126, the roof camera 104, the roof camera light source 106, the first sidewall camera 108, the first sidewall camera light source 110, the second sidewall camera 112, the second sidewall camera light source 114, the license plate camera 116, the license plate camera light source 118, or the vehicle sensor 122.

Figure 2:
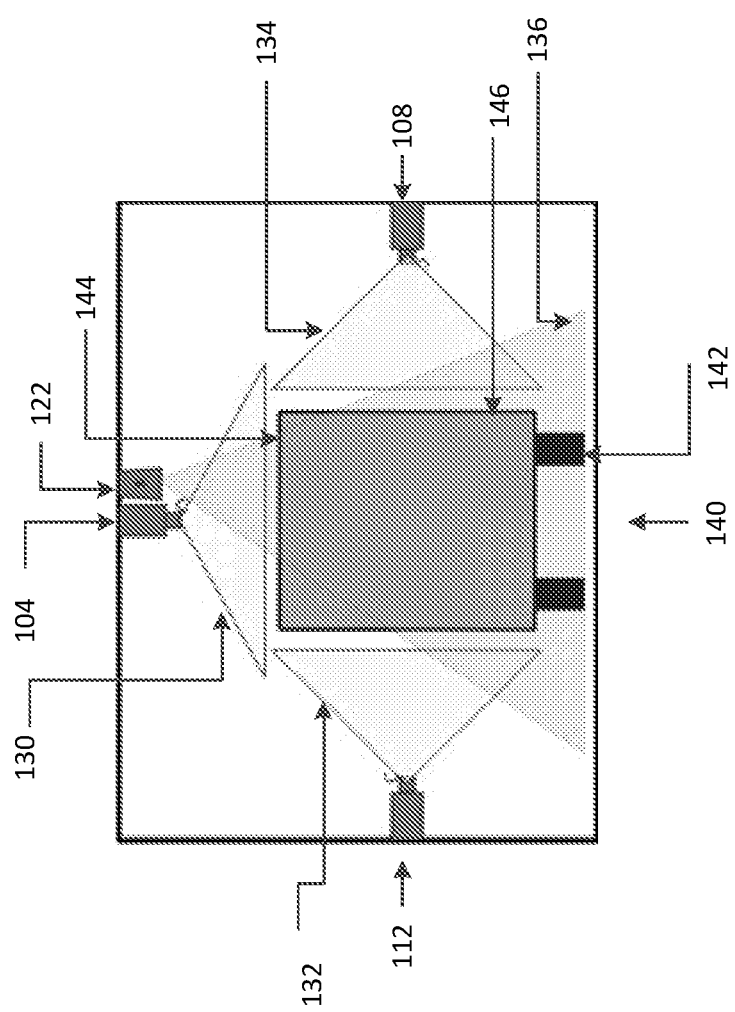
FIG. 2 shows a schematic diagram of an embodiment of a vehicle transporting an intermodal container through a checkpoint according to this disclosure.

FIG. 2 shows a schematic diagram of an embodiment of a vehicle transporting an intermodal container through a checkpoint according to this disclosure. In particular, a checkpoint includes an open-shaped (e.g. U-shape, C-shape, symmetrical, asymmetrical) or closed-shape (e.g. D-shape, O-shape, symmetrical, asymmetrical) frame or platform (e.g. metal, plastic) hosting the roof camera 104, the first sidewall camera 108, the second sidewall camera 112, and the vehicle sensor 122. The roof camera 104 has a roof field of vision 130. The first sidewall camera 108 has a first sidewall field of vision 134. The second sidewall camera 112 has a second sidewall field of vision 132. The vehicle sensor 122 has a sensing field 136. Note that the roof field of vision 130, the first sidewall field of vision 134, the second sidewall field of vision 132, and the sensing field 136 can be identical to or different from each other in shape, size, area, or volume in any permutational combination.

The checkpoint is set for a vehicle that has a plurality of wheels 142. For example, the vehicle can be a truck, a trailer, a railcar, or others. The vehicle transports an intermodal container 140 between the wheels 142 and the roof camera 104, while also being between the first sidewall camera 108 and the second sidewall camera 112. The intermodal container 140 has a roof 144 and a pair of sidewalls 146 extending from the roof 144 in a U-shape manner. However, note that the intermodal container 140 can be shaped or sized in various ways, such as a cube, a cuboid, a sphere, an ovoid, a pyramid, a wedge, or other shapes, such as polygonal, corner-less, symmetrical, asymmetrical, open-shaped, closed-shaped, or others.

The roof 144 is exposed to the roof camera 104 such that the roof 144 is in the roof field of vision 130. Note that the roof camera 104 has an optical axis that is substantially perpendicular to the roof 144. The pair of sidewalls 146 are exposed to the first sidewall camera 108 and the second sidewall camera 112 such that the pair of sidewalls 146 are in the first sidewall field of vision 134 and the second sidewall field of vision 132, respectively. Note that the first sidewall camera 108 and the second sidewall camera 112 have a pair of optical axis, respectively, that are substantially perpendicular to the sidewalls 146, respectively. Further, note that in poor illumination conditions, such as darkness, at least one of the roof camera light source 106, the first sidewall camera light source 110, or the second sidewall camera light source 114 can output a light (e.g. flash) to assist at least one of the roof camera 104, the first sidewall camera 108, the second sidewall camera 112, or the vehicle sensor 122 in operation.

When the vehicle includes a vehicle identifier, such as a vehicle registration plate or others, such as a license plate or others, the checkpoint can also include the license plate camera 116 and the license plate camera light source 118. The license plate camera 116 is positioned to capture the vehicle identifier. For example, when the vehicle includes a cabin and hosts the vehicle identifier on or in the cabin, then the license plate camera 116 can be oriented towards the area. Note that in poor illumination conditions, such as darkness, the license plate camera light source 118 can output a light to assist the license plate camera 116. In some embodiments, the vehicle identifier is captured non-optically, such as via a radio frequency interrogation, an acoustic identification, a thermal signature, a motion or proximity sensing value, a weight value, a shape pattern, a size pattern, or others. As such, in these embodiments, a suitable sensor can be used, whether additional or alternative to the license plate camera 116.

Figure 3:
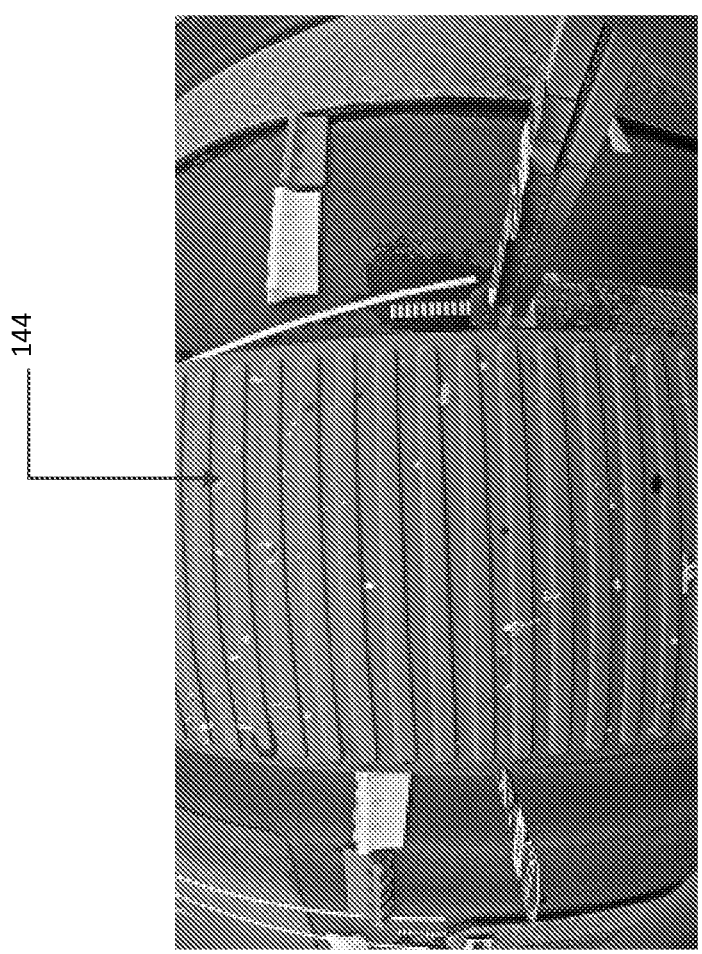
FIG. 3 shows a schematic diagram of an embodiment of a barrel distortion of a frame depicting a roof of an intermodal container according to this disclosure.
Figure 4A:
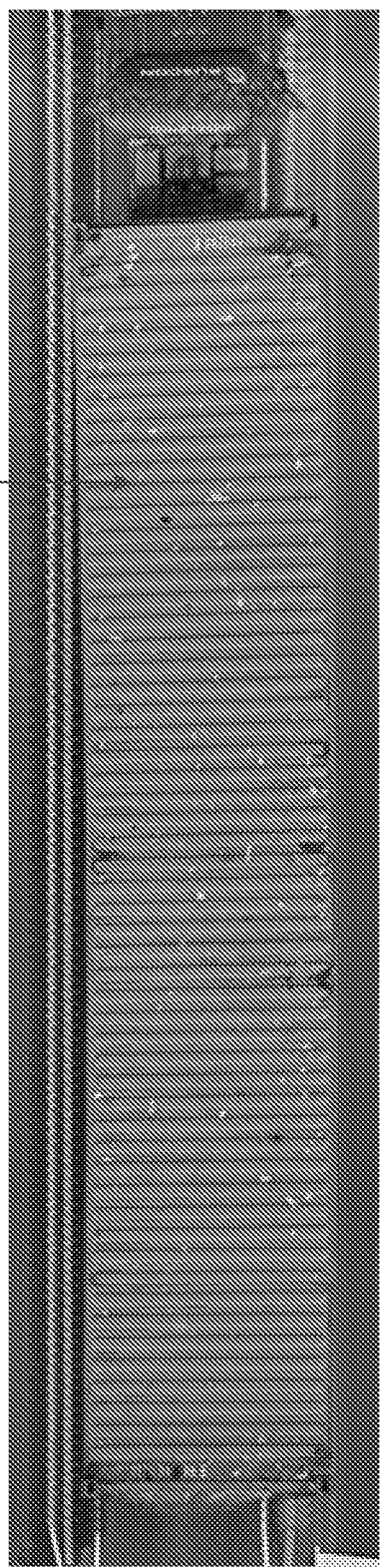
FIGS. 4a-4b show a pair of screenshots of a pair of embodiments of a pair of frames that have been stitched according to this disclosure.
Figure 4B:
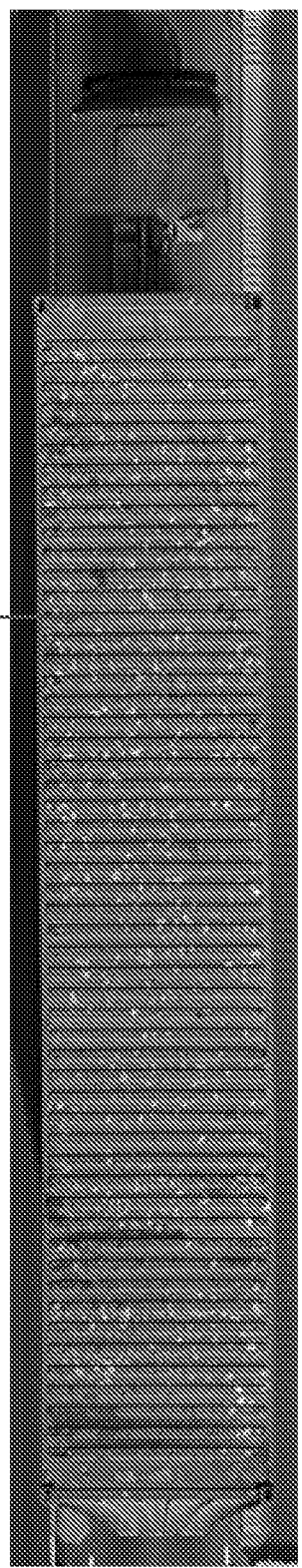

FIG. 3 shows a schematic diagram of an embodiment of a barrel distortion of a frame depicting a roof of an intermodal container according to this disclosure. FIGS. 4a-4b show a pair of screenshots of a pair of embodiments of a pair of frames that have been stitched according to this disclosure. In particular, when the vehicle with the wheels 142 transports the intermodal container 140 through the checkpoint, the roof camera 104 is able to partially capture the roof 144, as shown in FIG. 3. As such, there is a desire to stitch a set of images (a set of frames from a video sequence) captured via the roof camera 104 in order to obtain a complete or full image of the roof 144, as shown in FIGS. 4a-4b. Further, since the roof camera 104 is often positioned two or three meters above the roof 144, the roof camera 104 is equipped with a wide-angle lens, which can lead to image distortion, such as geometrical distortion, such as barrel distortion, as shown in FIG. 3. However, this image distortion precludes accurate stitching of the set of images. Therefore, this disclosure further discloses an algorithm to effectively remove or eliminate such image distortion, as shown in FIG. 3, where the algorithm corrects a geometrical distortion of a plane of an object, such as the roof 144 of the intermodal container 140, and results an less distorted image, as shown in FIGS. 4a-4b. Note that a similar state of being exists with respect to the first sidewall camera 108 and the second sidewall camera 112 and the pair of sidewalls 146.

Figure 5:
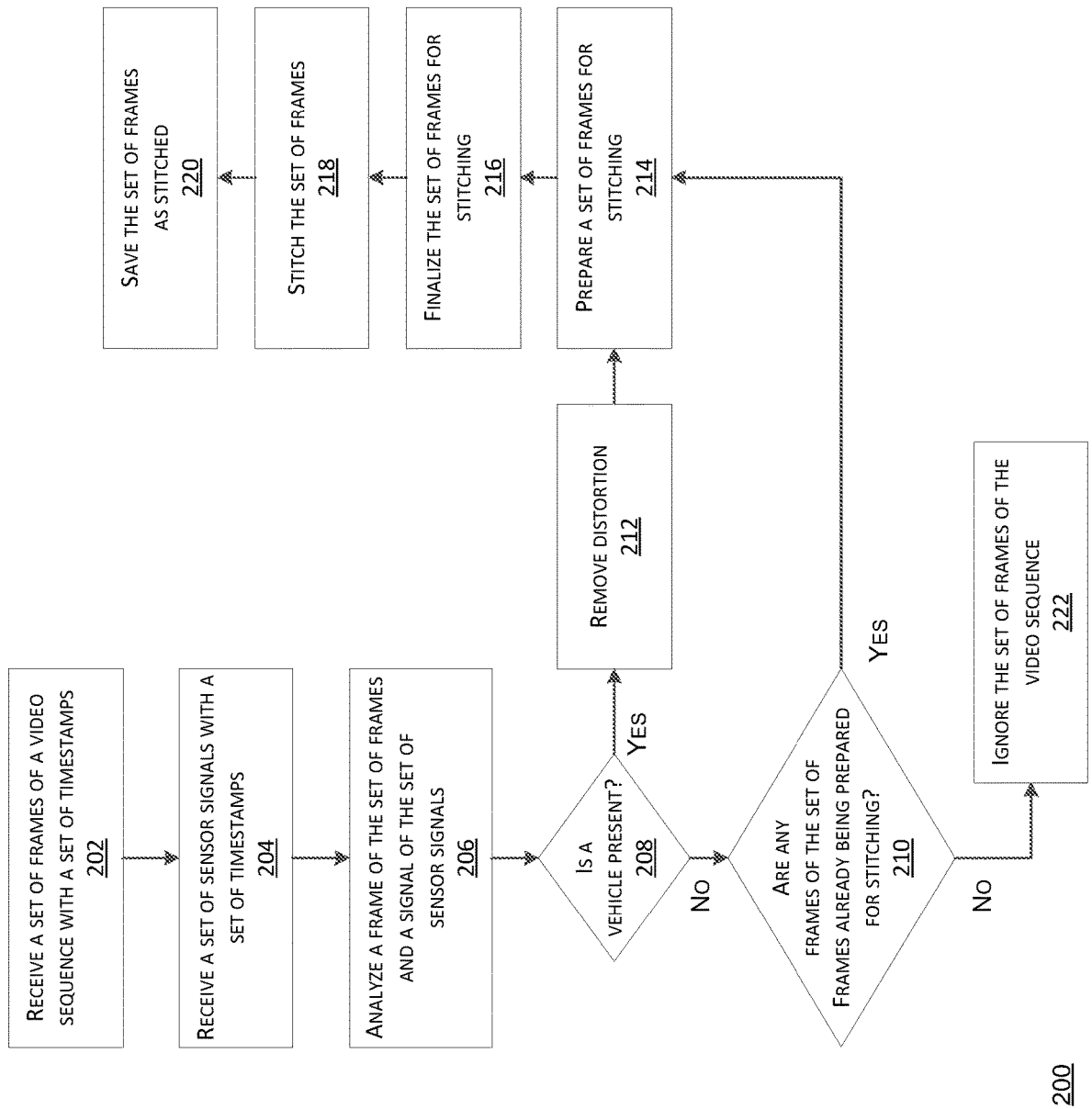
FIG. 5 shows a flowchart of an embodiment of a process for frame processing according to this disclosure.

FIG. 5 shows a flowchart of an embodiment of a process for frame processing according to this disclosure. In particular, a process 200 includes a set of blocks 202-222 which are performed via the topology 100 in order to convert what is shown in FIG. 3 into what is shown in FIGS. 4a-4b. Likewise, the process 200 can be performed for with respect to the first sidewall camera 108 and the second sidewall camera 112 and the pair of sidewalls 146.

In block 202, the server 124 receives a set of frames of a video sequence from the roof camera 104 over the network 102. The set of frames include a set of frame timestamps. The set of frames depicts the roof 144.

In block 204, the server 124 receives a set of signals from the vehicle sensor 122 over the network 102. The set of signals include a set of signal timestamps.

In block 206, the server 124 analyzes a frame of the set of the frames, which can include an imagery or a timestamp thereof, or a signal of the set of signals, which can include a signal datum or a timestamp thereof, such that the server 124 is able to determine whether a vehicle transporting the intermodal container 140 is present or absent in that specific frame. Note that the server 124 can take into account possible timing differences, if any, of frame arrivals (by time via the set of frame timestamps) from the roof camera 104 and signal arrivals (by time via the set of signal timestamps) from the vehicle sensor 122 by matching or mapping or correlating a timestamp of a frame of the set of frames and a timestamp of a signal of the set of signals when the vehicle sensor 122 is triggered to indicate a presence of the vehicle.

In block 208, the server 124 determines whether a vehicle is present. If yes, then the server 124 performs block 212. If no, then the server 124 performs block 210.

In block 210, the server 124 determines whether any frames of the set of frames is already being prepared at that time for stitching. If yes, then the server 124 performs block 214. If no, then the server 124 performs block 222. In some embodiments, if the server 124 is already performing a process of forming a set of frames for stitching and a newly received frame is indicative of the vehicle being absent, then the server 124 halts the process of forming the set of images for stitching.

In block 212, the server 124 removes distortion, such as geometrical distortion, such as barrel distortion, from at least one of the frames of the set of frames, such as the frame from block 206. For example, the server 124 can perform dewarping on at least one of the frames of the set of frames, such as the frame from block 206. For example, the server 124 can perform dewarping as disclosed in U.S. Pat. No. 9,547,883 or 9,609,197, both of which are incorporated by reference herein for all purposes as if copied and pasted herein.

In block 214, as the server 124 analyzes more frames from the set of frames, the server 124 iteratively prepares, as further described below, a set of frames, as dewarped from the set of frames of block 212, for stitching. For example, such preparation can include an insertion of the frame that has been analyzed, as per block 206, into the set of images, as already collected via the server 124. The server 124 can prepare the set of frames by performing an image cropping process (e.g. extract a central area of a frame for subsequent image stitching). Further, the server 124 can prepare the set of frame by evaluating an inter-frame shift of an object, such as the intermodal container 140. Such evaluation can be based on a search of an optimal pixel-by-pixel overlay or overlap that results from neighboring frames based on a metric L1 (taxicab geometry). For example, upon conclusion or during the evaluation, the server 124 can receive a result informative of a displacement of the object in pixels for a time period that elapsed between the camera 104 capturing the neighboring images. Moreover, the server 124 can prepare the set of frames by adding to the set of frames only those frames that have been cropped and only those frames for which a shift between those frames is necessary and sufficient for further stitching via a pixel-by-pixel blending of regions that overlap. For example, the server 124 uses only those frames for which the server 124 is able to provides a seamless stitching with a smooth transition from one frame to another frame.

In block 216, the server 124 finalizes, as prepared from the set of frames of block 214, the set of frames for stitching. For example, each frame in the set of frames that is subsequent to a first frame in the set of frames has a specified shift in pixels relative to the first frame. As such, the set of frames is ready for input into an image stitching algorithm running on the server 124.

In block 218, the server 124 stitches the set frames, as finalized from block 216. For example, the server 124 stitches the set of frames in order to obtain a more complete or more full frame depicting the object, which may be complete or full, such as the roof 144 or the pair of sidewalls 146. For example, the server 124 can stitch the set of frames by performing pixel-by-pixel blending, such as feather blending or others, of frame intersecting regions of the set of frames.

In block 220, the server 124 saves the set of frames, as stitched, into the database 126. Note that the server 124 can write the set of images, as stitched, to the database 126 such the set of frames, as stitched, is logically associated with the vehicle identifier, as captured via the license plate camera 116.

In block 222, the server 124 ignores the set of frames of the video sequence, as the vehicle is absent in a specific frame of the set of frames, such as a currently processed frame of the set of frames.

Accordingly, the process 200 enables a visual inspection of a structural condition of the intermodal container 140, while also enabling a receipt of documentary proof in a form of an image with reference to a date and time of travel of a vehicle and recognition of a state registration sign, such as a vehicle identifier. Notably, the process 200 does not mandate a presence of a user near the vehicle, i.e. the user can be remote from the vehicle. Further, the process 200 is advantageous over transporting the intermodal container 140 underneath a line-scan camera for several reasons. First, the process 200 minimizes or effectively reduces image compression or stretching, such as when the vehicle changes speed. Second, the process the process 200 minimizes or effectively reduces image distortion or perspective distortion, such as when the vehicle travels non-rectilinearly. Third, the process 200 enables the vehicle to temporarily stop. Fourth, the process 200 enables camera use for surveillance when no vehicle or intermodal container is present for image capture. Note that other benefits can exist as well, such as recording passages of vehicles through checkpoints and writing such recordations into a storage.

Figure 6:
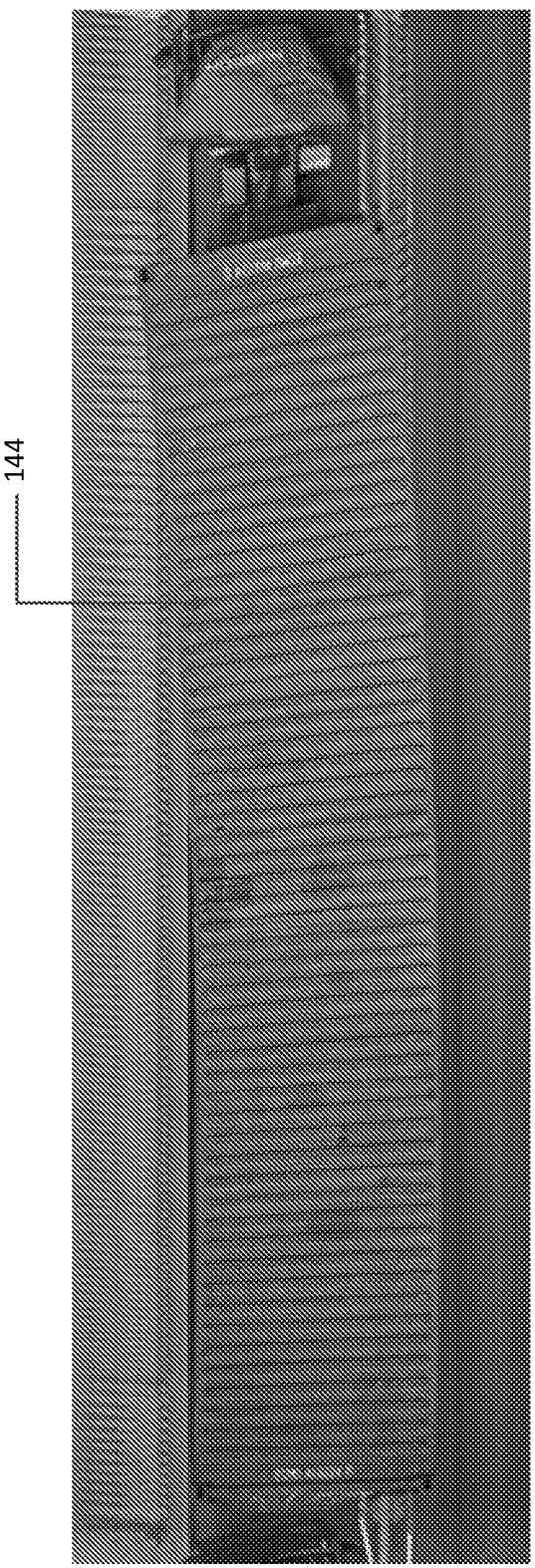
FIG. 6 shows a screenshot of an embodiment of a frame captured via a camera as a vehicle is traveling along a non-rectilinear path according to this disclosure.

FIG. 6 shows a screenshot of an embodiment of a frame captured via a camera as a vehicle is traveling along a non-rectilinear path according to this disclosure. When the vehicle is traveling along the non-linear path, such as when a section of a road, a track, or a conveyor assembly has a turn, then the camera 104 can capture the set of frames that depict the roof 144 in a distorted manner, as shown in FIG. 6 (violations of geometric shapes). Therefore, the set of frames requires straightening, which can be performed by adjusting the set of frames for stitching in order to compensate for any distortions to the set of images and can avoid what is shown in FIG. 6.

Figure 7:
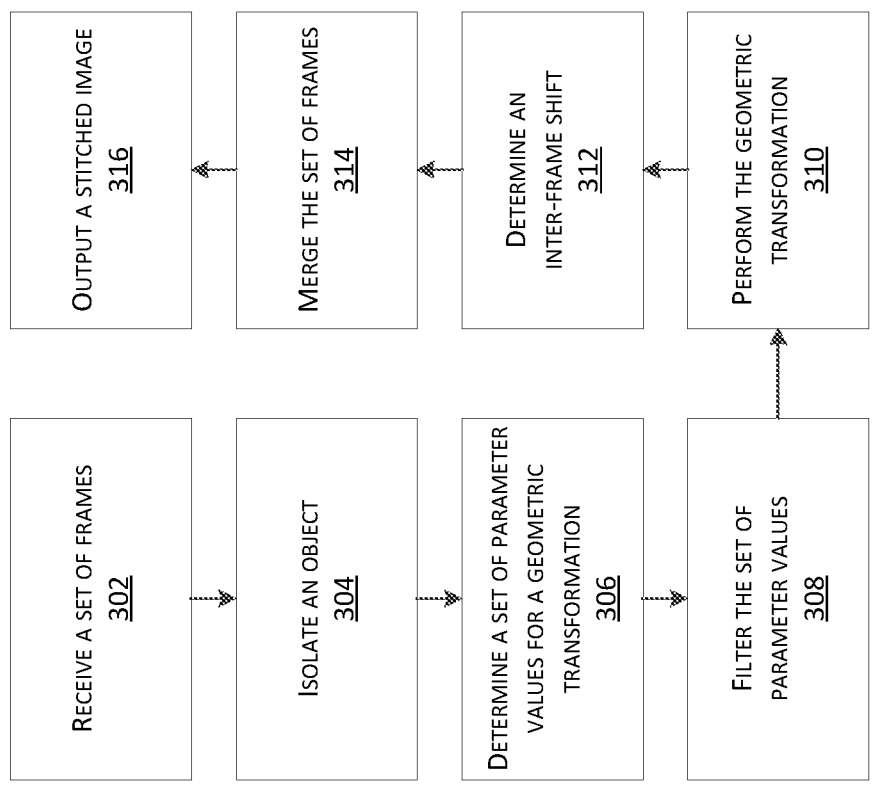
FIG. 7 shows a flowchart of an embodiment of a process for stitching at least two frames according to this disclosure.

FIG. 7 shows a flowchart of an embodiment of a process for stitching at least two frames according to this disclosure. The block 218 of FIG. 5 can include a plurality of blocks 302-316, which can be performed via the topology 100 of FIG. 1.

In block 302, the server 124 receives a set of frames for image stitching, such as from block 216.

In block 304, the server 124, for each frame in the frame set, isolates or extracts an object, such as the intermodal container 140, such as the roof 144. As such, the server 124 obtains a set of regions of interest (ROI) specified in a binary image form (binary masks).

In block 306, the server 124, for each frame in the frame set, for each ROI, determines a set of parameter values of a geometric or projective transformation, which enables a transformation of that ROI into a desired geometric shape, such as a rectangle, a square, or others. This results in a formation of a data structure, such as an array or others, that is populated with the set of parameter values.

In block 308, the server 124, for each frame in the frame set, filters the set of values based on a set of predefined criteria.

In block 310, the server 124, for each frame in the frame set, performs the geometric or projective transformation based on the set of values, as filtered.

In block 312, the server 124, for each frame in the frame set, determines an inter-frame shift of the object along at least two axis, such as an X-axis (horizontal) and a Y-axis (vertical). The inter-frame shift is based on the server 124 searching and finding an optimal pixel-by-pixel overlay or overlap that results from neighboring frames based on a metric L1 (taxicab geometry), as explained above.

In block 314, the server 124 stitches the frames on a pixel-by-pixel basis, such as via merging blending, or others.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
    determining, by a server, whether a set of data is informative of a presence of a vehicle relative to a checkpoint or an absence of the vehicle relative to the checkpoint, wherein the set of data includes a set of video frames received from a wide-angle lens camera hosted via the checkpoint and a set of signals received from a sensor hosted via the checkpoint, wherein the server is remote from the checkpoint;
    based on the server determining that the set of data is informative of the presence of the vehicle relative to the checkpoint:
        dewarping, by the server, the set of video frames;
        forming, by the server, a set of dewarped images from the set of video frames;
        stitching, by the server, the set of dewarped images such that an image is formed;
        relating, by the server, the image with an identifier of the vehicle;
        granting, by the server, a read access for the image and the identifier to a client remote from the wide-angle lens camera and the sensor;
    based on the server determining that the set of data is informative of the absence of the vehicle relative to the checkpoint:
        performing, by the server, at least one of:
            completing a formation of the set of dewarped images based on the formation already taking place at that time; or
            ignoring the set of video frames based on the formation not taking place at that time.

2. The method of claim 1, wherein the set of video frames includes a first set of timestamps, wherein the set of signals includes a set of sensed values and a second set of timestamps, wherein the set of sensed values corresponds to the second set of timestamps, wherein the server determines whether the set of data is informative of the presence of the vehicle relative to the checkpoint or the absence of the vehicle relative to the checkpoint based on reading, by the server, the first set of timestamps, the set of sensed values, and the second set of timestamps.

3. The method of claim 2, wherein the server determines the presence of the vehicle relative to the checkpoint or the absence of the vehicle relative to the checkpoint while accounting for a plurality of timing differences between the first set of timestamps and the second set of timestamps.

4. The method of claim 1, wherein the vehicle is transporting an object, wherein the set of dewarped images collectively depicts a side of the object, wherein the image wholly depicts the side of the object.

5. The method of claim 4, wherein the object is an intermodal container including a roof and a sidewall, wherein the side is at least one of the roof or the sidewall.

6. The method of claim 5, wherein the vehicle is at least one of a truck, a trailer, a railcar, a boat, an airplane, a crane, or a conveyor assembly.

7. The method of claim 1, wherein the wide-angle lens camera and the sensor are installed along a plane common to each other.

8. The method of claim 1, wherein the sensor is at least one of an optical sensor, a ultrasonic sensor, an ultrasound sensor, a laser sensor, a radar, a lidar, a heat sensor, an actuator, a mechanical linkage, a load cell, a motion sensor, a proximity sensor, a distance sensor, or a ferromagnetic sensor.

9. The method of claim 1, wherein the sensor is an all-weather sensor.

10. The method of claim 1, wherein the sensor is a first sensor, and further comprising:
receiving, by the server, the identifier from a second sensor hosted via the checkpoint;
storing, by the server, the identifier and the image in a database such that the image is related with the identifier relating in the database.

11. The method of claim 1, wherein the server performs completing the formation of the set of dewarped images based on the formation already taking place at that time.

12. The method of claim 1, wherein the server performs ignoring the set of video frames based on the formation not taking place at that time.

13. A system comprising:
a checkpoint hosting a wide-angle lens camera and a sensor configured to sense a vehicle;
a client remote from the wide-angle lens camera and the sensor; and
a server remote from the checkpoint, wherein the server is programmed to:
determine whether a set of data is informative of a presence of the vehicle relative to the checkpoint or an absence of the vehicle relative to the checkpoint, wherein the set of data includes a set of video frames received from the wide-angle lens camera and a set of signals received from the sensor;
based on the server determining that the set of data is informative of the presence of the vehicle relative to the checkpoint:
dewarp the set of video frames;
form a set of dewarped images from the set of video frames;
stitch the set of dewarped images such that an image is formed;
relate the image with an identifier of the vehicle;
grant a read access for the image and the identifier to the client;
based on the server determining that the set of data is informative of the absence of the vehicle relative to the checkpoint:
perform at least one of:
complete a formation of the set of dewarped images based on the formation already taking place at that time; or
ignore the set of video frames based on the formation not taking place at that time.

14. The system of claim 13, wherein the set of video frames includes a first set of timestamps, wherein the set of signals includes a set of sensed values and a second set of timestamps, wherein the set of sensed values corresponds to the second set of timestamps, wherein the server determines whether the set of data is informative of the presence of the vehicle relative to the checkpoint or the absence of the vehicle relative to the checkpoint based on the server reading the first set of timestamps, the set of sensed values, and the second set of timestamps.

15. The system of claim 14, wherein the server determines the presence of the vehicle relative to the checkpoint or the absence of the vehicle relative to the checkpoint while accounting for a plurality of timing differences between the first set of timestamps and the second set of timestamps.

16. The system of claim 13, wherein the vehicle is transporting an object, wherein the set of dewarped images collectively depicts a side of the object, wherein the image wholly depicts the side of the object.

17. The system of claim 16, wherein the object is an intermodal container including a roof and a sidewall, wherein the side is at least one of the roof or the sidewall.

18. The system of claim 13, wherein the wide-angle lens camera and the sensor are installed along a plane common to each other.

19. The system of claim 13, wherein the sensor is a first sensor, and the server is programmed to:
receive the identifier from a second sensor hosted via the checkpoint;
store the identifier and the image in a database such that the image is related with the identifier relating in the database.

20. The system of claim 13, wherein the server performs completing the formation of the set of dewarped images based on the formation already taking place at that time.

21. The system of claim 13, wherein the server performs ignoring the set of video frames based on the formation not taking place at that time.

* * * * *